United States Patent
Singh et al.

(10) Patent No.: US 12,081,362 B2
(45) Date of Patent: Sep. 3, 2024

(54) SYSTEM-IN-LOOP TESTING FOR ADAS SoCs

(71) Applicant: TEXAS INSTRUMENTS INCORPORATED, Dallas, TX (US)

(72) Inventors: Jasbir Singh, Bangalore (IN); Brian Ginsburg, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/192,271

(22) Filed: Mar. 4, 2021

(65) Prior Publication Data

US 2021/0281440 A1  Sep. 9, 2021

Related U.S. Application Data

(60) Provisional application No. 62/985,445, filed on Mar. 5, 2020.

(51) Int. Cl.
  *H04L 12/40* (2006.01)
  *G06F 16/28* (2019.01)

(52) U.S. Cl.
  CPC ...... *H04L 12/40117* (2013.01); *G06F 16/288* (2019.01); *H04L 12/40071* (2013.01); *H04L 2012/40273* (2013.01)

(58) Field of Classification Search
  CPC ......... H04L 12/40117; H04L 12/40071; H04L 2012/40273; G06F 16/288; G06F 11/3688; G06F 11/3664; G06F 11/263; G06F 11/3684
  See application file for complete search history.

(56) References Cited

U.S. PATENT DOCUMENTS

| | | | | |
|---|---|---|---|---|
| 5,548,589 | A * | 8/1996 | Jeon | H04Q 11/0478 370/465 |
| 6,735,773 | B1 * | 5/2004 | Trinh | H04L 12/5601 709/229 |
| 9,594,647 | B2 | 3/2017 | Meaney et al. | |
| 9,992,106 | B2 * | 6/2018 | Wang | H04L 67/131 |

(Continued)

FOREIGN PATENT DOCUMENTS

EP   3 445 045 A1   2/2019

OTHER PUBLICATIONS

International Search Report for PCT/US2021/020991 mailed Jun. 3, 2021.

(Continued)

*Primary Examiner* — Luat Phung
(74) *Attorney, Agent, or Firm* — Michael T. Gabrik; Frank D. Cimino

(57) ABSTRACT

A method includes receiving first data at a controller of an ADAS via a first virtual channel of a camera serial interface 2 (CSI-2) data interface. The method also includes receiving second data at the controller of the ADAS via a second virtual channel of the CSI-2 data interface. The method includes storing the first data at a first address in a memory, the first address specified by the first virtual channel. The method also includes storing the second data at a second address of a control register, the control register specified by the second data. The method includes performing a test using the first data and the second data.

20 Claims, 3 Drawing Sheets

(56) References Cited

U.S. PATENT DOCUMENTS

| | | | |
|---|---|---|---|
| 2012/0179741 A1* | 7/2012 | Gerdes | H04L 61/103 709/201 |
| 2013/0086236 A1* | 4/2013 | Baucke | H04L 45/50 709/223 |
| 2013/0107889 A1* | 5/2013 | Barabash | H04L 45/54 370/409 |
| 2014/0089451 A1* | 3/2014 | Eran | G06F 12/08 709/213 |
| 2014/0143558 A1 | 5/2014 | Kuesel et al. | |
| 2016/0226817 A1* | 8/2016 | Kang | H04L 41/12 |
| 2019/0057051 A1* | 2/2019 | Herrmann | G06F 13/4282 |
| 2019/0120955 A1 | 4/2019 | Zhong et al. | |
| 2019/0258251 A1 | 8/2019 | Ditty et al. | |
| 2020/0045540 A1* | 2/2020 | Hutchison | H04W 4/38 |
| 2021/0012118 A1* | 1/2021 | Bohacik | H04N 5/23203 |
| 2021/0142146 A1* | 5/2021 | Kale | G06V 10/955 |

OTHER PUBLICATIONS

NXP Semiconductors: MIPI—CSI2 Peripheral on i.MX6 MPUs, Jul. 2016, 32 pages.
European Search Report, dated Sep. 7, 2023, 15 pages.

* cited by examiner

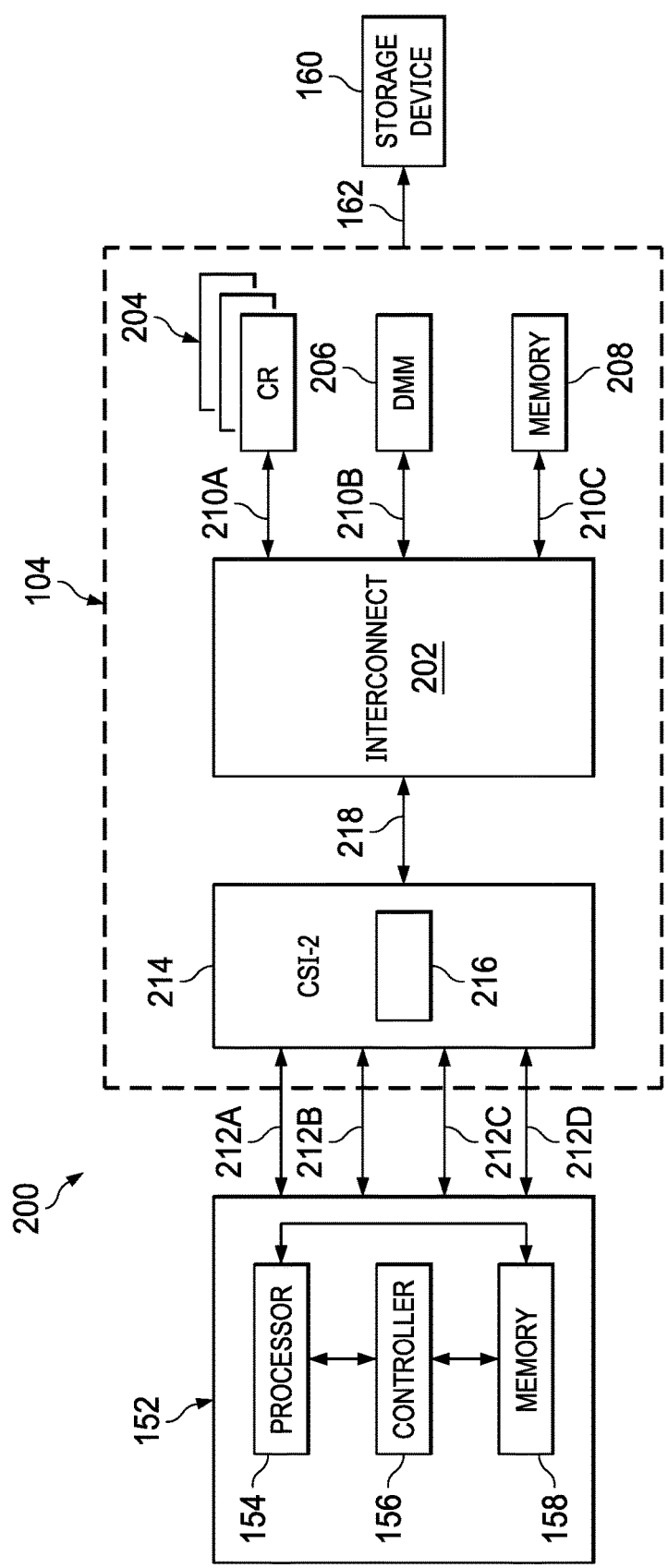
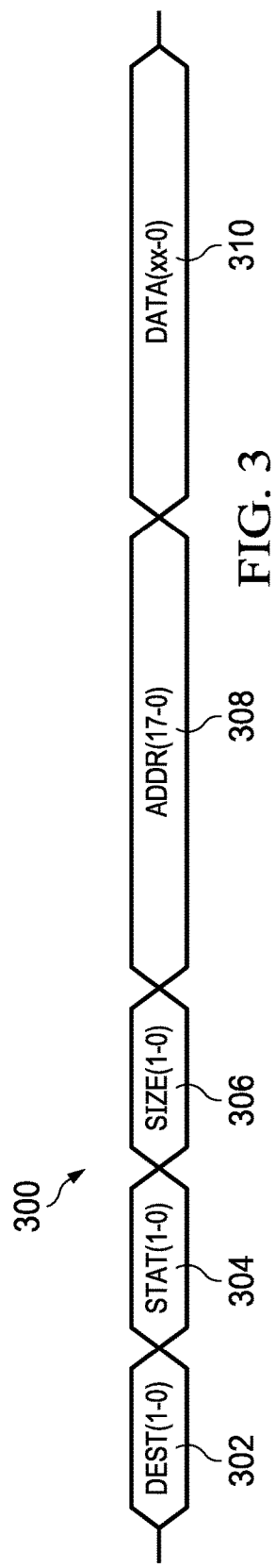
FIG. 2
FIG. 3

SYSTEM-IN-LOOP TESTING FOR ADAS SoCs

CROSS-REFERENCE TO RELATED APPLICATIONS

The present application claims priority to U.S. Provisional Patent Application No. 62/985,445, which was filed Mar. 5, 2020, is titled "System-In-Loop Testing For ADAS SoCs," and is hereby incorporated herein by reference in its entirety.

BACKGROUND

Advanced Driver Assistance Systems (ADAS) are vehicle-based systems that collect information about the environment surrounding the vehicle in order to provide for the safety and comfort of the driver. The information collected may be useful to warn the driver or automatically take appropriate actions, with features such as emergency braking, collision warning, object detection, lane departure warnings, lane keeping assist systems, traffic sign recognition, self-driving, etc. The ADAS may include an electronic control unit (ECU), various systems on chips (SoCs), microcontrollers (MCUs), monolithic microwave integrated circuits (MMICs), processors, memories, data storage systems, and other components.

Testing SoCs, integrated circuits (ICs), or other systems within an ADAS is important to ensure the reliability and safety of the ADAS. System-in-loop (SIL) testing is performed to test some or all of the parts of the ADAS in operation to ensure the parts work together without fault. SIL testing is also referred to as hardware-in-loop testing or software-in-loop testing. SIL testing reduces the time and cost of testing complex systems in their actual field of use. To perform SIL testing, data is captured from sensors in a real-world environment and stored in memory. Then, the data is used in a testing environment to determine if the ADAS and its algorithms (including hardware and software aspects) are operating properly, and to determine if the ADAS has any systematic faults.

SUMMARY

In accordance with at least one example of the description, a system includes an interface configured to communicate over a set of virtual channels. The interface is also configured to store a table containing entries that map the set of virtual channels to a set of addresses. The interface is configured to provide, using the table, a packet received via a first virtual channel of the set of virtual channels for storing at a first address of the set of addresses. The system also includes a data modification module (DMM) coupled to the interface and configured to cause the interface to modify an entry of the table.

In accordance with at least one example of the description, a system includes a playback system including a controller. The system also includes a microcontroller of an ADAS. The microcontroller includes an interface configured to communicate over a set of virtual channels. The interface is also configured to store a table containing entries that map the set of virtual channels to a set of addresses. The interface is configured to provide, using the table, a packet received via a first virtual channel of the set of virtual channels for storing at a first address of the set of addresses. The microcontroller includes DMM coupled to the interface and configured to cause the interface to modify an entry of the table.

In accordance with at least one example of the description, a method includes receiving first data at a controller of an ADAS via a first virtual channel of a camera serial interface 2 (CSI-2) data interface. The method also includes receiving second data at the controller of the ADAS via a second virtual channel of the CSI-2 data interface. The method includes storing the first data at a first address in a memory, the first address specified by the first virtual channel. The method also includes storing the second data at a second address of a control register, the control register specified by the second data. The method includes performing a test using the first data and the second data.

BRIEF DESCRIPTION OF THE DRAWINGS

For a detailed description of various examples, reference will now be made to the accompanying drawings in which:

FIG. 2 is a block diagram of an SIL testing system for an ADAS in accordance with various examples.

FIG. 3 is a virtual channel mapping update packet in accordance with various examples.

DETAILED DESCRIPTION

Figure 1A:
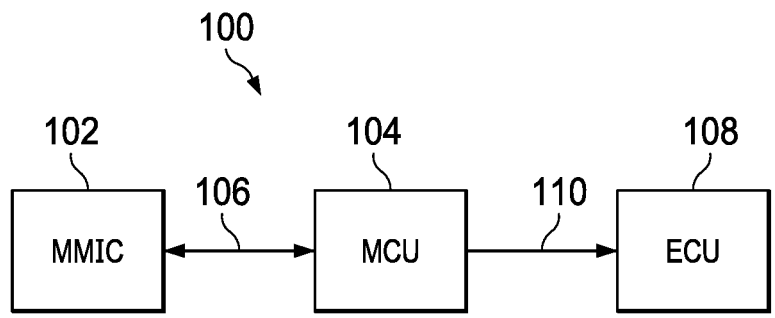
FIG. 1A is a block diagram of components of an ADAS in accordance with various examples.

Testing SoCs, ICs, or other systems within an ADAS using SIL testing is important to ensure the reliability and safety of the ADAS. During real-world operating conditions, data samples, such as data from a radar system, are captured and processed by the ADAS. To perform SIL testing, those data samples are stored in a database and used (e.g., played back using a playback system) in an SIL testing environment. The SIL testing environment attempts to recreate the operating environment of the ADAS. As an example, SIL testing is performed at the actual performance speed in which the system is used. The SIL testing environment receives, reads, and processes the data samples at the same rates that the samples are received and processed in the real-world operating conditions, to determine if the ADAS can adequately process, manage, and react to the data samples in real time. To do this, the SIL testing environment uses the same or similar software and hardware as actually deployed in the ADAS. This may avoid the complexity of adding an additional interface such as serial peripheral interface (SPI), universal asynchronous receiver-transmitter (UART), or a joint test action group (JTAG) interface, and supporting software.

In the ADAS, a data interface known as camera serial interface 2 (CSI-2) is useful to send captured data, such as captured radar sensor data, from an MMIC to an MCU. CSI-2 is a high-speed data interface that may transmit large amounts of data. During SIL testing, it is advantageous to use CSI-2 to transmit data to the MCU of the ADAS in the testing environment, just as CSI-2 is used in the operating environment. Both un-processed and processed data may be transmitted to the MCU using CSI-2. It is also desirable to transfer other types of data, such as control data, to the MCU during SIL testing. However, the CSI-2 protocol does not natively support transmitting control data to a specific memory addresses or control register within the MCU. In some alternative systems, an interface other than the CSI-2 interface may be used to transmit captured data and other types of data to the MCU during SIL testing. However, adding an additional interface to the MCU increases the cost of the MCU.

In examples herein, a data modification module (DMM) in the MCU enables the use of the CSI-2 interface to write data to a wide range of addresses and registers throughout the MCU data in which to write data during SIL testing of the MCU. More specifically, in examples, the CSI-2 interface is used for SIL testing, along with a DMM in the MCU. The DMM, combined with the CSI-2 interface, enables access to memory as well as control registers during SIL testing of the MCU. Access to specific addresses in the MCU is enabled by using virtual channels (VCs). The CSI-2 protocol supports up to four VCs that may be used to identify different streams of data. These separate streams of data may be directed toward different destinations within the MCU using different CSI-2 VCs for each type of data. The destination could be a control register or a specific location in a memory. In various examples, one or more DMMs may direct the data to a destination via an interconnect based on the VC. Thus, DMMs and VCs may be leveraged to enable a CSI-2 interface to transmit both data and other types of information during SIL testing.

FIG. 1A is a block diagram of components of an ADAS 100 in accordance with various examples. ADAS 100 may include a number of other components not expressly shown in FIG. 1A. ADAS 100 includes an MMIC 102 in one example. MMIC 102 may be a frequency modulated continuous wave (FMCW) radar transceiver in one example. In one example, MMIC 102 is a sensor on an automobile that uses radar to detect the location and/or motion of objects around the automobile. The detected radar information is transmitted to other components within ADAS 100, and that information is used by ADAS 100 to provide feedback to the driver of the automobile or to take automated actions, such as emergency braking. MMIC 102 may include one or more radar transmitters and one or more radar receivers (not shown in FIG. 1A). ADAS 100 may include other types of sensors, in addition to radar sensors, in other examples. For example, ADAS 100 may include cameras, lidar (laser imaging, detection, and ranging), or ultrasound sensors, in addition to or instead of radar transceivers.

MMIC 102 may be a radar front end that sends and receives radio frequency (RF) radar signals in one example. MMIC 102 may receive the RF signals and transform them into digital signals using an analog to digital converter (ADC, not shown in FIG. 1A). MMIC 102 may process the RF signals, such as by performing one or more fast Fourier transforms (FFTs) on the RF signals. The results of the FFTs may then be transmitted to MCU 104. In another example, the RF signals may be provided to MCU 104 without processing by MMIC 102. In another example, the RF signals could be partially processed by MMIC 102, with additional processing performed by other components in ADAS 100, such as an MCU 104.

MMIC 102 may couple to MCU 104 via a CSI-2 interface 106. MCU 104 is the master control unit of ADAS 100. MCU 104 may receive un-processed data or semi-processed data and perform further processing. MCU 104 may also send raw or semi-processed data to storage and or an electronic controller unit (ECU) 108 or take appropriate actions based on the data. For example, MMIC 102 may be a radar front-end chip that sends captured raw ADC samples to the MCU 104 so that the MCU 104 may process data to determine the range, angle, and velocity of an object. In this manner, the MCU 104 may use algorithms that detect objects and determine appropriate actions based on data received from MMIC 102.

MCU 104 sends data to ECU 108 via connection 110. ECU 108 may include a combination of hardware (such as processors, controllers, data interfaces, and memory) along with software that enables ECU 108 to process data streams quickly and reliably. ECU 108 processes sensor data, interprets the sensor data, and may take actions based on the sensor data to prevent accidents or provide other safety features. Connection 110 may be any appropriate type of bus, such as an Ethernet connection or a controller area network (CAN) bus.

Figure 1B:
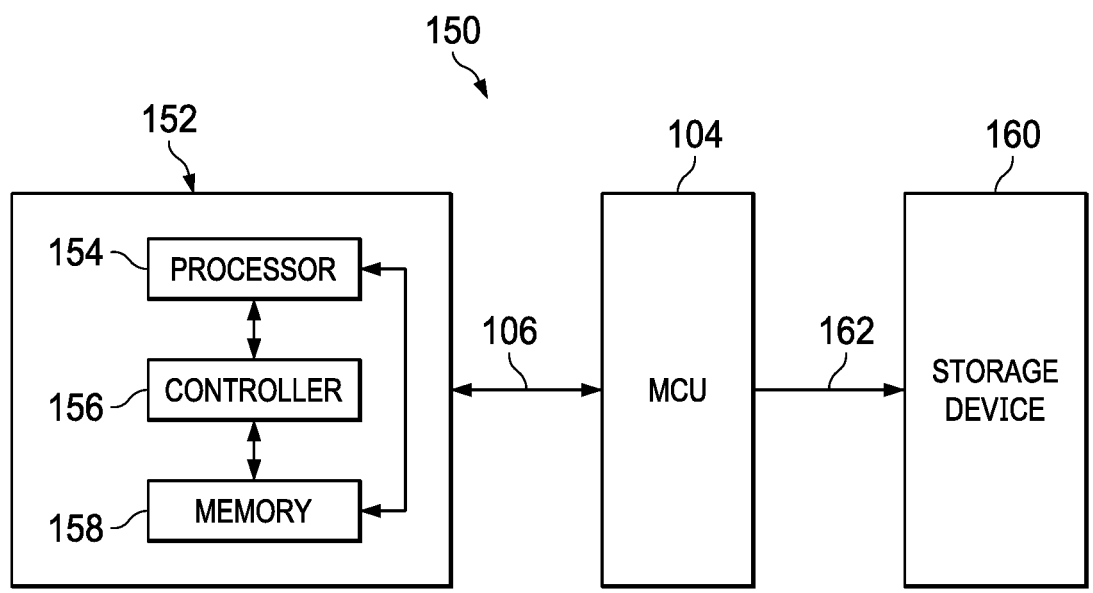
FIG. 1B is a block diagram of components of an SIL testing system for an ADAS in accordance with various examples.

FIG. 1B is a block diagram of components of an SIL testing system 150 for an ADAS in accordance with various examples. As described above, SIL testing system 150 is intended to recreate the operating environment of ADAS 100. In this example, SIL testing system 150 includes playback system 152. Playback system 152 may include any appropriate hardware and software to store the captured data from ADAS 100 (e.g., data captured from the MMIC 102 output and/or semi-processed data from MCU 104). After the data is captured during real-world operation of ADAS 100, the captured data is loaded into playback system 152 by the operators of SIL testing system 150. Playback system 152 is configured to transmit that captured data to MCU 104 for testing. Playback system 152 includes processor 154, controller 156, and memory 158 in this example, but one or more of these components may be absent in other examples. Playback system 152 stores captured data in memory 158, and may perform any processing and transmission of the captured data with processor 154 and controller 156. Playback system 152 transmits captured data to MCU 104 via CSI-2 interface 106, just as the data is transferred in ADAS 100. In this example, the playback system 152 uses VCs of the CSI-2 interface 106 to transmit captured data to MCU 104, as described below. Captured data may include captured radar data in one example. In some examples, the data transmitted on the VCs includes not only the captured data, but also header data. The header data may indicate a radar chirp profile or chirp information used by MCU 104. MCU 104 may read the header data and take any appropriate actions with the captured data. For example, MCU 104 may process the captured data, store the processed data in an appropriate location, and produce output data that results from processing the data. MCU 104 may also transmit the processed data to storage device 160 via connection 162. Connection 162 may be a controller area network (CAN) bus in one example. Storage device 160 may include any device that may receive and store data from MCU 104. The data stored in storage device 160 may then be used in SIL testing to analyze whether the hardware and software in ADAS 100 are operating as intended. Connection 162 may be any suitable connection, such as an Ethernet connection or another high-speed connection.

SIL testing system 150 supports deploying the test system with the same or similar software and hardware as actually deployed in the ADAS 100. This enables SIL testing system 150 to test ADAS 100 at the data transmission and processing speeds that ADAS encounters during real-world operation. For example, if data is transmitted to MCU 104 in ADAS 100 at 600 Megabits per second, SIL testing system 150 is able to test the system with that same throughput. CSI-2 interface 106 provides a high-speed interface to transmit data to MCU 104. Accessing control registers in MCU 104 using the CSI-2 protocol is not natively supported by the protocol. However, as described below, the VCs of CSI-2 interface 106 are useful for accessing control registers in MCU 104. A DMM in MCU 104 (not shown in FIGS. 1A and 1B, but described with reference to FIG. 2 below) receives recorded sensor data and other data in a particular format (interpreted by DMM) from playback system 152 via a particular VC and directs the various types of data to their respective destinations in memory, control registers, etc. based on the identity of the VC. In some such examples, the DMM may receive mappings that indicate where (e.g., an address) data of a given VC should be stored.

FIG. 2 is a block diagram of an SIL testing system 200 for an ADAS 100 in accordance with various examples. SIL testing system 200 includes playback system 152, MCU 104, and storage device 160. These components are described above in FIG. 1B, and operate as described above in one example. Playback system 152 includes processor 154, controller 156, and memory 158.

MCU 104 includes a CSI-2 interface 214 that couples the MCU 104 to the SIL testing system 200. The CSI-2 interface 214 receives data from any other CSI-2 device, such as playback system 152 or MMIC 102, using a set of virtual channels (e.g., virtual channels 212A-D). The CSI-2 interface 214 includes a virtual-channel-to-address table 216, explained in further detail below, that is used to direct communications to various locations of the MCU 104. Accordingly, the CSI-2 interface 214 is coupled to an interconnect 202 to send and receive the data to and from the various components within MCU 104.

Interconnect 202, for example, is coupled to control registers (CR) 204, data modification module (DMM) 206, and memory 208. Interconnect 202 may also be coupled to other components not shown in FIG. 2, such as sensors, controllers, processors, etc. CR 204 includes storage registers that change or control the behavior of other components within MCU 104, such as processors or other controllers. Data may be written to CR 204 to control the operation of MCU 104 while the ADAS 100 is in use. Data written to CR 204 may change one or more settings within MCU 104. For example, data written to CR 204 may turn on or off certain functions of ADAS 100, or otherwise alter the operation of ADAS 100, in some examples. Data written to CR 204 may alter the operation of a sensor in ADAS 100 in other examples.

DMM 206 stores control data into CR 204. DMM 206 transfers data from an external device, such as playback system 152, to CR 204 in one example. In another example, DMM 206 may perform direct writes to memory 208 without intervention of a processor in MCU 104. DMM 206 may write to locations in memory 208 specified by data packets received from an external device, and may also write data to locations in memory 208 specified by DMM 206. In some examples, the DMM 206 is separate from the CSI-2 interface 214, although in other examples, the DMM 206 is incorporated into the CSI-2 interface 214.

Interconnect 202 is coupled to CR 204 via link 210A. Interconnect is coupled to DMM 206 via link 210B. Interconnect 202 is coupled to memory 208 via link 210C. Interconnect 202 is coupled to CSI-2 interface 214 via link 218. Interconnect 202 may also couple to any other components in MCU 104 to allow communication and data transfer among the components of MCU 104.

In an example, a stream of data from an external device, such as playback system 152, is transmitted to the CSI-2 interface 214 of the MCU 104 via virtual channels 212A, 212B, 212C, and/or 212D (collectively, VCs 212) of the CSI-2 protocol. Header data transmitted to MCU 104 identifies which of the four VCs is associated with a given stream of data. VCs 212 are configured to transmit certain types of data to MCU 104. In one example, a first VC 212 sends un-processed or semi-processed captured data to MCU 104. Captured data is the data acquired by a sensor, such as MMIC 102. CSI-2 transmits the captured data at speeds used during operation of ADAS 100. A second VC 212 is configured to send a different type of data to MCU 104, such as control data that is stored in CR 204. Each VC 212, including the third and fourth VCs 212, may be used to send either captured data or control data. For example, one type of test may use one VC 212 for control data and three VCs 212 for captured data. Another type of test may use three VCs 212 for control data and one VC 212 for captured data. In some examples, some of the VCs 212 may be idle during testing. Any number or combination of VCs 212 may be used in examples herein.

When data is received, the CSI-2 interface 214 determines the virtual channel associated with the data, then using table 216, determines a destination for the data. In some examples, the destination specified by the table 216 for a given virtual channel is an address within memory (e.g., memory 208). When the destination is a memory address, the CSI-2 interface 214 may provide the data to the memory via interconnect 202. The table 216 may also map a virtual channel to a control register (e.g., control register 204). When the destination is a control register, the CSI-2 interface 214 may provide the data directly to the control register via the interconnect 202 or may provide it to another component for writing to the control register. The table 216 may also map a virtual channel to a non-memory component (e.g., DMM 206). In some examples, table 216 maps a given virtual channel to DMM 206, which is used to write data to the control registers and may also be used to update the table 216. In this way, the CSI-2 interface 214 and the DMM 206 may provide access to the complete address space of MCU 104, and may direct data to the appropriate address.

FIG. 3 is a VC mapping update packet 300 in accordance with various examples. In some examples, the playback system 152 may provide to the MCU 104 the VC mapping update packet 300 to modify the virtual-channel-to-address table 216. The VC mapping update packet 300 may include a destination field 302, a state field 304, a size field 306, an address field 308, and/or a data field 310. The VC mapping update packet 300 is sent via a virtual channel associated with the DMM 206 in the current table 216 and is received by the CSI-2 interface 214. The CSI-2 interface 214 determines, based on the virtual channel and table 216, that the destination is the DMM 206 and forwards the update packet 300 to the DMM 206 via the interconnect 202.

The DMM 206 receives and parses the update packet 300 and recognizes that the value of the address field 308 maps to an address of an entry in the table 216 for a particular virtual channel. The virtual channel used to send the update packet 300 may be different from the virtual channel associated with the table entry in the address field 308. For example, an update packet 300 sent via VC0 may be used to update a table entry for VC1. The value in the data field 310 of the update packet 300 represents the new address to be stored in the table entry. Thus, the DMM 206 may provide the value in the data field 310 back to the CSI-2 interface for writing in the table 216 at the entry indicated by the value in the address field 308. In this way, subsequent data received via the virtual channel associated with the address field 308 of the update packet 300 is written to the address specified in the data field 310 of the update packet 300.

The playback system 152 may also provide to the MCU 104 data for writing to the memory 208 and/or control registers 204. In particular, the playback system 152 may provide a packet for writing to the control registers 204 using a virtual channel mapped to the DMM 206. The packet is received by the CSI-2 interface 214, which determines, based on the virtual channel and table 216, that the destination is the DMM 206 and forwards the update packet 300 to the DMM 206 via the interconnect 202. The packet 300 may include control information and the address of the particular CR 204 to which the control information should be written. DMM 206 parses the data received via the packet 300 and writes the control information to the correct CR 204, based on the address included with the control information. In this example, one VC 212 may be dedicated to sending control information to CR 204 via DMM 206, while one or more of the other three VCs 212 are dedicated to sending captured data to memory 208. DMM 206 stores the control information in the correct CR 204 using the address information included with the control information, and the captured data is stored in memory 208.

In another example, a test may be performed to test the algorithms in ADAS 100 using the captured data stored in playback system 152. Algorithms in ADAS 100 are used to process radar data collected by MMIC 102. Radar data is collected by a radar sensor such as MMIC 102 and then processing is performed on the radar data. First dimension, second dimension, and third dimension FFTs may be performed on the radar data to produce FFT data and determine the range, velocity, and angle of the radar data. The range indicates the distance of an object from the radar sensor. The velocity indicates the speed of approach of the object, and the angle indicates the angle of the object to the radar sensor. Classification algorithms in ADAS 100 use the range, velocity, and angle data produced by performing one or more FFTs to determine whether the object is a person, vehicle, obstruction, etc. Then, based on the results of the classification algorithm, an appropriate action may be taken, such as providing a warning to the driver or applying emergency braking.

The radar data is transmitted to memory 208 via one or more VCs 212. The VC 212 that is used indicates the address in memory 208 where the specific radar data should be written. For example, data from a first VC 212 may be stored beginning at a first location in memory 208, while data from a second VC 212 may be stored beginning at a second location in memory 208. During operation, the algorithms that provide the driver assistance services in ADAS 100 expect certain types of data to be located in certain addresses in memory 208. If the correct and expected data is written to those locations in memory 208, the algorithms retrieve the correct data from the expected locations in memory 208 and process the data. Then, an appropriate action may be taken by the algorithms based on the results of processing the data. The algorithms used in SIL testing system 200 are the same algorithms used when ADAS 100 is deployed in real-world operating conditions. Therefore, SIL testing system 200 allows the algorithms in ADAS 100 to be tested in similar operating conditions to a real-world ADAS deployment. These operating conditions include transmitting captured data at a high speed using the CSI-2 protocol.

As noted above, data transmitted over a VC 212 may be sent directly to an address in memory 208 with or without the use of DMM 206. Thus, in some examples, the CSI-2 interface 214 is configured to send the data to the address in memory 208 where the captured data should be stored via the interconnect 202. In this example, interconnect 202 directs the data to memory 208, where the captured data is stored in the proper location in memory 208. In another example, data may be transmitted from the CSI-2 interface 214 to DMM 206, and DMM 206 then transmits the data to memory 208.

In some examples, different types of data may be written to different locations in memory 208. For example, unprocessed data captured by MMIC 102 may be written to a first address, while processed or semi-processed data from MMIC 102 may be written to a second address. To change the address indicated by VC 212A to which the data is to be written, playback system 152 can send a command through VC 212A to update a base address that indicates where VC 212A is to send data. Therefore, examples herein allow data to be written to any address in memory 208 or in CR 204.

Data transmitted over VCs 212 may indicate the size of the data to be stored as well as the address to which the data is to be stored. For example, the size of the data may be byte, word, double-word, 64-bit, etc. DMM 206 parses the size and the address information found in header data to store the captured data to the appropriate location in memory 208 or CR 204. DMM 206 issues an appropriate command to write the captured data to the appropriate address, and the command may include the size of the captured data as well. As one example, DMM 206 may issue a word-write command to indicate that the captured data is word sized. If the captured data is double-word sized, DMM 206 may issue a double-word-write command. Other data sizes and other write commands may be used in other examples.

Figure 4:
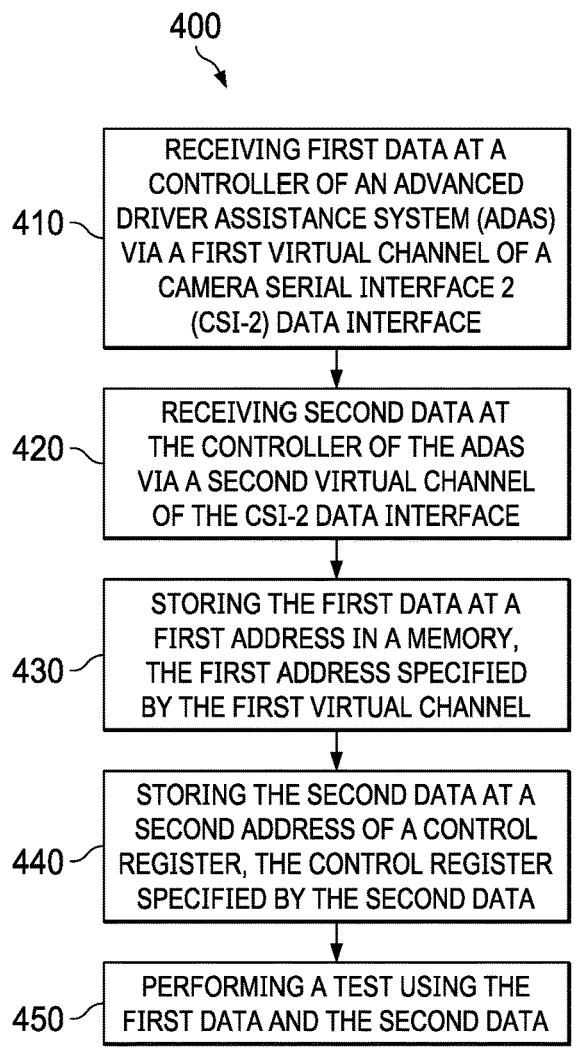
FIG. 4 is a flowchart of a method for SIL testing in accordance with various examples.

FIG. 4 is a flowchart of an example method 400 for SIL testing in accordance with various examples. The steps of method 400 may be performed in any suitable order. The hardware and/or software that performs the steps of method 400 in one example is described in FIGS. 1B and 2 above. Any appropriate hardware and/or software may be used in other examples.

Method 400 begins at 410, where a controller of an ADAS, such as MCU 104, receives first data via a first virtual channel of a CSI-2 data interface. As described in FIG. 2 above, a VC such as VC 212A may be used to transmit captured data from a playback system 152 to MCU 104 in order to perform SIL testing of an ADAS. A goal of SIL testing is to recreate the real-world operating conditions that the ADAS will encounter in order to test the software and hardware of the ADAS in response to incoming data from various sources, such as sensors. The data that is received may include the data captured from various sources as well as header data that indicates a size of the captured data, a storage address, etc.

Method 400 continues at 420, where a controller of the ADAS, such as MCU 104, receives second data via a second virtual channel of the CSI-2 data interface. A VC such as VC 212B may be used to transmit the second data. Transmitting different types of data over different VCs 212 allows for MCU 104 to handle the data from different VCs in a different manner. Data from different VCs may be stored in different locations or directed to different components within MCU 104.

Method 400 continues at 430, where MCU 104 stores the first data at a first address in a memory, where the first address is specified by the first virtual channel. The memory may be a memory such as memory 208. In an example, the first virtual channel stores the data directly to the correct address in memory 208. In another example, DMM 206 may store the captured data in memory 208.

Method 400 continues at 440, where MCU 104 stores the second data in a control register, where the control register is specified by the second data. As described above, DMM 206 may receive the second data via a second VC 212B, and DMM 206 may read an address included with the second data that indicates where the second data should be stored. DMM 206 has access to CR 204 in MCU 104, and may write control data into any control register of CR 204.

Method 400 continues at step 450, where a test is performed on MCU 104 using the first data and the second data. Therefore, using this technique, control data from playback system 152 may be transmitted to MCU 104 using the CSI-2 protocol, and DMM 206 may store the control data in the appropriate control register of CR 204. In addition, the CSI-2 protocol allows for high speed transfer of captured data, such as radar data, so that SIL testing may be performed in conditions that mimic the real-world operating conditions of ADAS 100.

Figure 5:
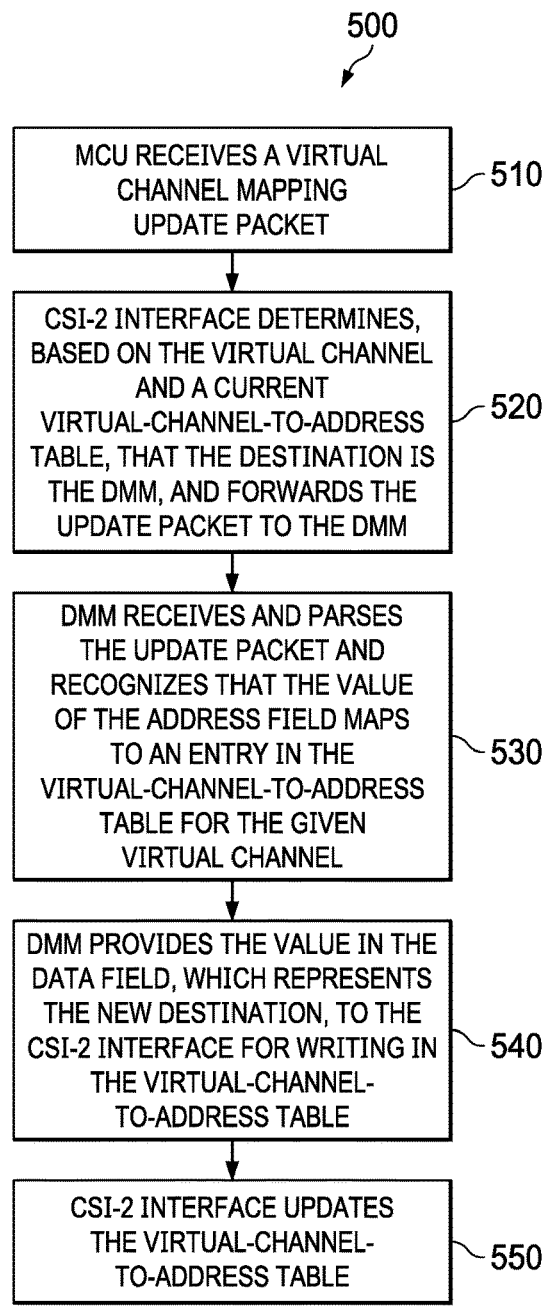
FIG. 5 is a flowchart of a method for SIL testing in accordance with various examples.

FIG. 5 is a flowchart of an example method 500 for SIL testing in accordance with various examples. The steps of method 500 may be performed in any suitable order. The hardware and/or software that performs the steps of method 500 in one example is described in FIGS. 1B and 2 above. Any appropriate hardware and/or software may be used in other examples.

Method 500 begins at 510, where an MCU 104 receives a VC mapping update packet. The VC mapping update packet specifies a new destination, such as an address or entity within the MCU 104 to associate with a given virtual channel. In some examples, the VC mapping update packet 300 includes an address field 308 that specifies a table entry associated with the given virtual channel and a data field 310 that specifies the new destination. The VC mapping update packet is sent via a virtual channel 212 associated with a DMM 206 of the MCU 104 and is received by a CSI-2 interface 214 of the MCU 104.

Method 500 continues at 520, where the CSI-2 interface 214 determines, based on the virtual channel 212 and a current virtual-channel-to-address table 216, that the destination is the DMM 206 and forwards the update packet 300 to the DMM 206.

Method 500 continues at 530, where the DMM 206 receives and parses the update packet 300 and recognizes that the value of the address field 308 maps to an entry in the virtual-channel-to-address table 216 for the given virtual channel 212.

Method 500 continues at 540, where the DMM 206 provides the value in the data field 310, which represents the new destination, to the CSI-2 interface 214 for writing in the virtual-channel-to-address table 216. At 550, the virtual-channel-to-address table is updated. In this way, subsequent data received via the virtual channel 212 associated with the address field 308 of the update packet 300 is written to the address specified in the data field 310 of the update packet 300. In examples herein, the same CSI-2 interface on MCU 104 that sends sensor data to MCU 104 during operation of ADAS 100 is also used to send captured data and control information to MCU 104 during SIL testing. Using the same CSI-2 interface for both applications saves the cost of adding an additional interface to MCU 104. Also, using the same CSI-2 interface during SIL testing enables SIL testing to more closely re-create the actual real-world operating conditions of ADAS 100, such as the speed that sensor data is transmitted to MCU 104.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means+/−10 percent of the stated value. Modifications are possible in the described examples, and other examples are possible within the scope of the claims.

What is claimed is:

1. A system, comprising:
   multiple destination components including a data modification module (DMM); and
   an interface including a table containing entries that map each virtual channel of a set of virtual channels to a particular destination component of the multiple destination components, the interface configured to:
   communicate over the set of virtual channels;
   store, using the table, a first packet received via a first virtual channel of the set of virtual channels at a first destination component of the multiple destination components; and
   receive an update packet via a second virtual channel of the set of virtual channels, in which the second virtual channel is associated with the DMM in a current version of the table;
   wherein the DMM is configured to:
   receive the update packet from the interface, and parse the update packet to determine that, in the current version of the table, a first value of the update packet map to a destination component that is associated with a particular virtual channel of the set of virtual channels and a second value of the update packet represents a new destination component to be associated with the particular virtual channel; and
   cause the interface to modify the current version of the table to generate an updated version of the table in which the second value is written in place of the first value to associate the particular virtual channel with the new destination component, such that the system is configured to process a subsequent packet received via the particular virtual channel associated with the first value of the update packet by storing the subsequent packet at the new destination component associated with the second value of the update packet.

2. The system of claim 1, wherein the interface is further configured to couple to a playback component for testing of the system.

3. The system of claim 1, wherein the interface is a camera serial interface 2 (CSI-2) data interface.

4. The system of claim 1, further comprising a memory coupled to the interface and the DMM.

5. The system of claim 1, wherein the first packet is captured radar data from an advanced driver assistance system (ADAS).

6. The system of claim 1, wherein the interface is further configured to write the first packet to the first destination component.

7. The system of claim 1, wherein the DMM is further configured to write the first packet to the first destination component.

8. The system of claim 1, wherein the multiple destination components include a control register configured to store the first packet.

9. The system of claim 8, wherein the DMM is further configured to store the first packet in the control register.

10. The system of claim 1, wherein the DMM is further configured to provide the second value to the interface.

11. The system of claim 1,
wherein the particular virtual channel is a third virtual channel of the set of virtual channels,
wherein the third virtual channel is different from the second virtual channel.

12. A system, comprising:
a microcontroller that includes:
multiple destination components including a memory, a control register, and a data modification module (DMM); and
an interface including a table containing entries that map each virtual channel of a set of virtual channels to a particular destination component of the multiple destination components, the interface configured to:
communicate over the set of virtual channels;
store, using the table, a first packet received via a first virtual channel of the set of virtual channels in the memory of the multiple destination components; and
receive an update packet via a second virtual channel of the set of virtual channels, in which the second virtual channel is associated with the DMM in a current version of the table;
wherein the DMM is configured to:
receive the update packet from the interface, and parse the update packet to determine that, in the current version of the table, a first value of the update packet maps to a destination component that is associated with a particular virtual channel of the set of virtual channels and a second value of the update packet represents a new destination component to be associated with the particular virtual channel; and
cause the interface to modify the current version of the table to generate an update version of the table in which the second value is written in place of the first value to associate the particular virtual channel with the new destination component, such that the system is configured to process a subsequent packet received via the particular virtual channel associated with the first value of the update packet by storing the subsequent packet at the new destination component associated with the second value of the update packet.

13. The system of claim 12, wherein the interface is further configured to couple to a playback component for testing of the system.

14. The system of claim 13, wherein the DMM is further configured to:
determine that the first value in the update packet maps to the destination component in the current version of the table associated with the second virtual channel.

15. The system of claim 12, wherein the interface is a camera serial interface 2 (CSI-2) data interface.

16. The system of claim 12, wherein each of the memory and the control register is coupled to the interface.

17. The system of claim 12, wherein the interface is further configured to write the first packet to the particular destination component.

18. The system of claim 12,
wherein the particular virtual channel is a third virtual channel,
wherein the third virtual channel is different from the second virtual channel.

19. A method comprising:
storing, by an interface and using a table, a first packet received via a first virtual channel of the set of virtual channels at a first destination component of the multiple destination components, the table containing entries that map each virtual channel including the first virtual channel of a set of virtual channels to a particular destination component of the multiple destination components;
receiving, by the interface, an update packet via a second virtual channel of the set of virtual channels, in which the second virtual channel is associated with the DMM in a current version of the table, the update packet having first and second values;
providing, by the interface, the update packet to a data modification module (DMM) of the multiple destination components;
parsing the update packet, by the DMM, to determine that, in the current version of the table, the first value maps to a destination component in a current version of the table that is associated with a particular virtual channel of the set of virtual channels and the second value represents a new destination component to be associated with the particular virtual channel;
receiving, by the interface from the DMM, the second value extracted from the update packet by the DMM;
writing the second value to the table to modify the current version of the table to generate an updated version of the table to associate the particular virtual channel with the new destination component; and
in response to receiving a subsequent packet via the particular virtual channel associated with the first value of the update packet, storing the subsequent packet at the new destination component associated with the second value of the update packet.

20. The method of claim 19,
wherein the particular virtual channel is a third virtual channel of the set of virtual channels, and
wherein the third virtual channel is different from the second virtual channel.

* * * * *